United States Patent
Agiv et al.

(12)

(10) Patent No.: US 10,789,605 B2
(45) Date of Patent: Sep. 29, 2020

(54) SYSTEMS AND METHODS FOR ANALYSIS OF BEVERAGE DISPENSING DATA

(71) Applicant: WeissBeerger Ltd., Tel-Aviv (IL)

(72) Inventors: Omer Agiv, Ramat-HaSharon (IL); Ori Fingerer, Tel-Aviv (IL); Gil Kaplan, Rishon-LeZion (IL)

(73) Assignee: WeissBeerger Ltd., Tel-Aviv (IL)

( * ) Notice: Subject to any disclaimer, the term of this patent is extended or adjusted under 35 U.S.C. 154(b) by 892 days.

(21) Appl. No.: 14/650,891

(22) PCT Filed: Dec. 12, 2013

(86) PCT No.: PCT/IL2013/051032
§ 371 (c)(1),
(2) Date: Jun. 10, 2015

(87) PCT Pub. No.: WO2014/091492
PCT Pub. Date: Jun. 19, 2014

(65) Prior Publication Data
US 2015/0317756 A1    Nov. 5, 2015

(30) Foreign Application Priority Data
Dec. 12, 2012 (IL) .......................................... 223576

(51) Int. Cl.
*G06Q 10/02* (2012.01)
*G06Q 30/02* (2012.01)
*G06Q 50/12* (2012.01)

(52) U.S. Cl.
CPC ......... *G06Q 30/0206* (2013.01); *G06Q 30/02* (2013.01); *G06Q 50/12* (2013.01)

(58) Field of Classification Search
CPC ..... G06Q 30/0206; G06Q 30/02; G06Q 50/12
(Continued)

(56) References Cited

U.S. PATENT DOCUMENTS 6,504,481 B2   1/2003 Teller
6,751,525 B1   6/2004 Crisp, III
(Continued)

FOREIGN PATENT DOCUMENTS

GB   199928904   12/1999
GB   200009271    4/2000
(Continued)

OTHER PUBLICATIONS

Harbortouch, Harbortouch Releases Advanced POS Software Packages for Retail, Convenience Store and Spirits Industry Merchants: Customizable Solution Provides Immediate Sales and Operational Benefits—Includes Age Verification Integration for Liquor and Convenience Stores, PR Newswire, Apr. 12, 2012 (Year: 2012).*

(Continued)

*Primary Examiner* — Charles Guiliano

(57) ABSTRACT

There is provided a computer-implemented method of providing price recommendations for beverage dispensing facilities, the method comprising: receiving signals indicative of beverage dispensing at least at one beverage dispensing facility from at least one beverage dispensing sensor which monitors the at least one beverage dispensing facility and generates the signals; automatically analyzing the signals for calculating a statistical pattern of beverage consumption at the at least one beverage dispensing facility; automatically generating a price recommendation profile for the at least one beverage dispensing facility according to the statistical pattern; and selecting for presentation the price recommendation profile.

15 Claims, 11 Drawing Sheets

(58) Field of Classification Search
USPC .............................................. 705/7.29, 7.35
See application file for complete search history.

(56) References Cited

U.S. PATENT DOCUMENTS

| | | |
|---|---|---|
| 6,799,085 B1 | 9/2004 | Crisp, III |
| 7,020,680 B2 | 3/2006 | Defosse |
| 7,120,596 B2 | 10/2006 | Hoffman et al. |
| 7,158,918 B2 | 1/2007 | Bunn et al. |
| 7,162,391 B2 | 1/2007 | Knepler et al. |
| 7,203,572 B2 | 4/2007 | Crisp, III |
| 7,496,527 B2 | 2/2009 | Silverstein et al. |
| 7,768,396 B2 | 8/2010 | Teller |
| 7,779,099 B2 | 8/2010 | Raghunathan et al. |
| 7,881,960 B2 | 2/2011 | Ramamurti |
| 7,904,357 B2 | 3/2011 | Bunn |
| 8,003,145 B2 | 8/2011 | Gutwein et al. |
| 8,022,832 B2 | 9/2011 | Vogt et al. |
| 8,170,834 B2 | 5/2012 | Knepler et al. |
| 8,248,254 B2 | 8/2012 | Vogt et al. |
| 8,429,027 B2 | 4/2013 | Zheng |
| 8,453,878 B2 | 6/2013 | Palmquist |
| 8,458,312 B2 | 6/2013 | Raghunathan et al. |
| 8,610,536 B2 | 12/2013 | Libby et al. |
| 8,626,564 B2 | 1/2014 | Bippert et al. |
| 8,649,490 B2 | 2/2014 | Gavillet |
| 8,671,012 B2 | 3/2014 | Gross |
| 8,700,479 B2 | 4/2014 | Crawford et al. |
| 8,739,840 B2 | 6/2014 | Mattos, Jr. et al. |
| 8,751,037 B2 | 6/2014 | Peters et al. |
| 8,880,427 B1* | 11/2014 | Jones ................... G06Q 10/087 705/22 |
| 8,954,347 B1 | 2/2015 | Einfalt |
| 2002/0116348 A1 | 8/2002 | Phillips et al. |
| 2007/0214055 A1 | 9/2007 | Temko |
| 2008/0147211 A1* | 6/2008 | Teller ................... G06Q 10/087 700/90 |
| 2010/0063870 A1* | 3/2010 | Anderson ............. G06Q 10/10 705/7.29 |
| 2010/0256826 A1* | 10/2010 | Crisp, III ............. B67D 1/0057 700/283 |
| 2011/0187664 A1* | 8/2011 | Rinehart ................ G06F 3/041 345/173 |
| 2013/0275183 A1* | 10/2013 | Cohen ................... G06Q 30/02 705/7.35 |

FOREIGN PATENT DOCUMENTS

| | | |
|---|---|---|
| JP | 2003-192096 | 7/2003 |
| JP | 2004-519021 | 6/2004 |
| JP | 2006-254274 | 9/2006 |
| WO | WO 00/25097 | 5/2000 |
| WO | WO 01/43088 | 6/2001 |
| WO | WO 01/91001 | 11/2001 |
| WO | WO 2014/091492 | 6/2014 |

OTHER PUBLICATIONS

Notice of Reasons for Rejection dated Dec. 26, 2017 From the Japan Patent Office Re. Application No. 2015-547274 and Its Translation Into English. (9 Pages).

Supplementary European Search Report and the European Search Opinion dated Jul. 8, 2016 From the European Patent Office Re. Application No. 13862136.2.

International Preliminary Report on Patentability dated Jun. 25, 2015 International Bureau of WIPO Re. Application No. PCT/IL2013/051032.

International Search Report and the Written Opinion dated Apr. 8, 2014 From the International Searching Authority Re. Application No. PCT/IL2013/051032.

Roston "A Beer by the Sensor", The New York Times, Nov. 8, 2013.

Communication Pursuant to Article 94(3) EPC dated Dec. 6, 2018 From the European Patent Office Re. Application No. 13862136.2. (8 Pages).

* cited by examiner

WeissBeerger information statistics breweries bars profile settings logout

Promotion manager
Promotion tracker->

| Time | Dates | Brand | Measure | Prize |
|---|---|---|---|---|
| ☑ 18:00-20:00 | From: | ● Carlsberg | ○ Liters | ● 50% refund |
| ☐ 20:00-22:00 | To: | ○ Tuborg | ● Average per seat | ○ $100 |
| ☐ 22:00-00:00 | | ○ Stella | ○ % increase | ○ Custom: ____ |
| ☐ 00:00-02:00 | | | | |

[ Activate Promotion ]

Contest manager

| Time | Dates | Brand | Discount |
|---|---|---|---|
| ☑ 18:00-20:00 | From: | ● Carlsberg | ○ 10% |
| ☐ 20:00-22:00 | To: | ○ Tuborg | ● 20% |
| ☐ 22:00-00:00 | | ○ Stella | ○ 30% |
| ☐ 00:00-02:00 | | | ○ Custom: ____ |

[ Activate Contest ]

Auto pourer

| Time | Dates | Brand | Target Mode |
|---|---|---|---|
| ☑ 18:00-20:00 | From: | ● Carlsberg | ∗ Increase revenues |
| ☐ 20:00-22:00 | To: | ○ Tuborg | ∗ Increase volume |
| ☐ 22:00-00:00 | | ○ Stella | ∗ TV advertisement effectiveness |
| ☐ 00:00-02:00 | | | |

☐ Pause auto pourer in case of contest / discount?

[ Activate Autopourer ]

FIG. 7

WeissBeerger   information   statistics   breweries   bars   profile settings   logout FIG. 8 - Promotion manager      Promotion tracker->

| Promotion ID | Type | Time | Date | Status | Brand | Prize / discount | Measure | bars | Winner / results | Promotion Price |
|---|---|---|---|---|---|---|---|---|---|---|
| | | | | | | | | | | |
| 15234 | contest | 18:00-22:00 | 1-7/5/13 | done | carlsberg | 50% refund | % increase | 152 bars | Dizi bar, 168 Liters | $220 |
| | | | | | | | | | | |
| | | | | | | | | | | |

FIG. 8

| | No promotion | 5% off second glass | 15% off first glass | Glass + wine glass |
|---|---|---|---|---|
| No promotion | 1 brand x / 1 brand y | 1.2 brand x / 0.8 brand y | 1.1 brand x / 0.9 brand y | 0.9 brand x / 1.3 brand y |
| 20% off second glass | 0.9 brand x / 0.7 brand y | 1.5 brand x / 0.4 brand y | 1.2 brand x / 0.7 brand y | 1.1 brand x / 1 brand y |
| 30% off first glass | 1.6 brand x / 1 brand y | 1.7 brand x / 0.9 brand y | 1.5 brand x / 0.8 brand y | 1.3 brand x / 1.1 brand y |
| Glass + 2 shoots | 0.9 brand x / 1 brand y | 0.7 brand x / 1.2 brand y | 0.5 brand x / 1.4 brand y | 1 brand x / 1.1 brand y |

Brand Y (competitor brand) — columns
Brand X — rows

FIG. 10

SYSTEMS AND METHODS FOR ANALYSIS OF BEVERAGE DISPENSING DATA

RELATED APPLICATIONS

This application is a National Phase of PCT Patent Application No. PCT/IL2013/051032 having International filing date of Dec. 12, 2013, which claims the benefit of priority of Israeli Patent Application No. 223576 filed Dec. 12, 2012. The contents of the above applications are all incorporated by reference as if fully set forth herein in their entirety.

FIELD AND BACKGROUND OF THE PRESENT INVENTION

The present invention, in some embodiments thereof, relates to systems and/or methods for analyzing data and, more particularly, but not exclusively, to systems and/or methods for analyzing beverage dispensing data.

The worldwide beer market was worth approximately $500 billion in 2012. About 60% of the global consumption is made off-trade meaning bought and consumed in different places, for example, bought in supermarkets, kiosks, or other stores. About 40% of the consumption is made on-trade, or at the location of purchase, for example, bars, restaurants, clubs, or other venues. Out of the 40% on-trade purchases, about 85% is consumed as draught beer from beer taps. These statistics indicate that there is an approximately $170 billion market share of beer consumed via beer taps.

The supply chain of breweries to bars is quite simple nowadays and relies most of the times on direct sale by the brewery to the bars (2 tier market). Most breweries install for free the beer infrastructure in the bar (e.g., beer coolers, beer lines, beer tower and taps) and supply the beer kegs to the bar on a weekly/dual weekly basis.

Most bars in Europe have 2-4 beer taps which are owned by only one brewery. Therefore, there is a kind of exclusivity of pouring only the beer brands of one brewery via their beer infrastructure as long as it is installed in the bar and the brewery provides incentives and discounts in exchange. Some "Irish Pubs" have larger variety of beer brands by multiple breweries. Most medium/large breweries have whole ranges of beer types: amber, dark lager, blond lager, stout and more in order to have a full portfolio offering to the bar.

In these business models, breweries supply beer kegs on a weekly/dual weekly basis as per the request of the bar owner, which makes calculations for consumption forecasts in a manual way, and by personal assumptions. Once the brewery supplies the full beer kegs to the front door of the bar, the brewery gathers the empty kegs for refill and for re-use in the upcoming keg order.

SUMMARY OF THE PRESENT INVENTION

An aspect of some embodiments of the present invention relates to systems and/or methods for analyzing beverage dispensing data to provide price recommendations, quality measures and/or advertisements.

According to an aspect of some embodiments of the present invention there is provided a computer-implemented method of providing price recommendations for beverage dispensing facilities, the method being carried out by a beverage dispensing analysis unit programmed to carry out the steps of the method, which comprise: receiving signals indicative of beverage dispensing at least at one beverage dispensing facility from at least one beverage dispensing sensor which monitors the at least one beverage dispensing facility and generates the signals; automatically analyzing the signals for calculating a statistical pattern of beverage consumption at the at least one beverage dispensing facility; automatically generating a price recommendation profile for the at least one beverage dispensing facility according to the statistical pattern; and selecting for presentation the price recommendation profile.

According to some embodiments of the invention, the price recommendation profile comprises a temporary price reduction for the beverage within at least one of a time range and one or more dates.

According to some embodiments of the invention, automatically analyzing further comprises automatically comparing the signals from one beverage dispensing facility against at least one other beverage dispensing facility to generate the price recommendation profile.

According to some embodiments of the invention, the method further comprises automatically forecasting future beverage consumption patterns according to past beverage consumption patterns.

According to some embodiments of the invention, the method is performed in substantially real time so that the price recommendation profile is in accordance with current beverage consumption patterns.

According to some embodiments of the invention, the method further comprises receiving signals indicative of a number of patrons in the facility and generating the price recommendation profile in accordance with the number of patrons.

According to some embodiments of the invention, the method further comprises receiving data from an external source and generating the price recommendation profile in accordance with the received external source data. Optionally, the data from the external source comprises one or more of: current weather, weather forecast, day of week, holidays, special events.

According to some embodiments of the invention, the method further comprises receiving a target profile associated with beverage consumption, and generating the price recommendation profile in view the target profile.

According to some embodiments of the invention, the method further comprises automatically monitoring beverage consumption during implementation of the price recommendation profile. Optionally, the method further comprises generating future price recommendation profiles according to monitored effects of beverage consumption during implementation of previous price recommendations profiles.

According to some embodiments of the invention, the method further comprises determining the most cost-effective price recommendation profile provided by manufacturers to beverage dispensing facilities.

According to some embodiments of the invention, the automatically analyzing comprises automatically the signals for calculating a statistical pattern of beverage consumption for at least two different beverages at the at least one beverage dispensing facility; and wherein automatically generating comprises automatically generating a price recommendation profile for one of the beverages according to the statistical pattern so that the second beverages is cannibalized.

According to some embodiments of the invention, the beverage is beer.

According to some embodiments of the invention, the beverage dispensing facility is selected from the group comprising: bar, pub, hotel, restaurant.

According to some embodiments of the invention, the price recommendation profile comprises a price per liter for at least one of beverage dispensing facilities and clients of the facilities.

According to some embodiments of the invention, the automatically analyzing further comprises clustering dispensing patterns into standard beer glass of about 0.5 liter or about 0.3 liter.

According to an aspect of some embodiments of the present invention there is provided a computer-implemented method of beverage advertising, the method being carried out by a beverage dispensing analysis unit programmed to carry out the steps of the method, which comprise: receiving signals indicative of dispensing of a beverage at a plurality of beverage dispensing facilities from at least one beverage dispensing sensor which monitors the plurality of beverage dispensing facilities and generates the signals; automatically analyzing the signals for calculating a statistical pattern of consumption of the beverage at the plurality of beverage dispensing facilities; automatically generating a beverage advertising profile for the beverage according to the statistical pattern; and selecting for presentation promotional content associated with the beverage according to the beverage advertising profile.

According to some embodiments of the invention, the promotional content is promoted by a brewery.

According to some embodiments of the invention, the beverage advertising profile is generated by the manufacturer of the beverage and directly outputted to the beverage consumer.

According to some embodiments of the invention, the beverage advertising profile is generated according to geographical beverage consumption patterns.

According to some embodiments of the invention, the method further comprises outputting the selected promotional content to a mobile device operated by the beverage consumer.

According to some embodiments of the invention, the method further comprises monitoring changes in beverage consumption after the selection of the promotional content.

According to some embodiments of the invention, the method further comprises generating forecasts of beverage consumption patterns with and without implementation of the beverage advertising profile, and analyzing real time beverage consumption data to determine when the facilities have implemented the beverage advertising profile or not.

According to an aspect of some embodiments of the present invention there is provided a computer-implemented method of beverage quality monitoring for beverage dispensing facilities, the method being carried out by a beverage dispensing analysis unit programmed to carry out the steps of the method, which comprise: receiving signals indicative of quality associated events of a dispensed beverage at a plurality of beverage dispensing facilities from at least one beverage dispensing sensor which monitors the plurality of beverage dispensing facilities and generates the signals; automatically analyzing the signals for determining quality of the beverage at the plurality of beverage dispensing facilities according to the quality associated event; and presenting an indication of the quality.

According to some embodiments of the invention, the quality associated event comprises replacement of a beverage container and the quality indication comprises the time the replacement container has been open. Optionally, the replacement of the beverage container is detected by color changes of the beverage.

According to some embodiments of the invention, the quality associated event comprises cleaning patterns of sanitation maintenance of a beverage container and the quality indication comprises the detected cleaning patterns compared against a maintenance cleaning schedule.

According to some embodiments of the invention, the quality indication is a calculated quality score according to the detected events, so that the quality score is indicative of a quality rank of the beverage.

According to some embodiments of the invention, the method is carried out by the manufacturer of the beverage to perform quality control of the beverages at the dispensing facility.

According to an aspect of some embodiments of the present invention there is provided a system for analyzing dispensed beverages at a beverage dispensing facility, the system comprising: at least one beverage dispensing sensor for generating signals indicative of dispensing of one or more beverages, wherein each of a plurality of beverage dispensing facilities has the at least one beverage dispensing sensor; a plurality of first hardware processors, each processor in electrical communication with the dispensing sensors installed within each beverage dispensing facility, the first processors programmed for converting the generated signals into a form suitable for transmission over a network; a plurality of network interfaces for transmitting the signals over a communication network, each interface in electrical communication with each of the first processors; a second hardware processor in electrical communication with the communication network for receiving the signals sent from the first processors; a non-transitory memory having stored thereon program modules for instruction execution by the second hardware processor, comprising: a module for analyzing the generated signals to generate statistical data indicative of consumption of the one or more beverages at the plurality of facilities.

According to some embodiments of the invention, the beverage dispensing sensors are fluid sensors for measuring fluid flow through beverage dispensing tubes connecting a beverage container with a tap.

According to some embodiments of the invention, the system further comprises at least one people count sensor for generating signals indicative of an estimated number of patrons in at least one of the beverage dispensing facilities, and a module for analyzing consumption patterns according to the number of patrons.

According to some embodiments of the invention, the system further comprises a mobile device having network connectivity for electrically connecting to the second processor, the mobile device having a screen for displaying the statistical data, the mobile device having an input element for entering commands to control the second processor.

According to some embodiments of the invention, the system further comprises a screen having an attachment sized and shaped to fit on a beer tap, the screen being in electrical communication with the second processor for displaying the statistical data generated by the second processor.

According to an aspect of some embodiments of the present invention there is provided a computer-implemented method of scoring beverage dispensing facilities, the method being carried out by a beverage dispensing analysis unit programmed to carry out the steps of the method, which comprise: receiving signals indicative of beverage dispensing at a plurality of beverage dispensing facilities from at least one beverage dispensing sensor which monitors the plurality of beverage dispensing facilities and generates the signals; automatically analyzing the signals for calculating a statistical pattern of beverage consumption at the at least one beverage dispensing facility; automatically generating scores for each of the plurality of beverage dispensing facilities according to the statistical pattern; and selecting for presentation the generated scores.

According to some embodiments of the invention, the scores are generated for points of sale at the plurality of beverage dispensing facilities.

According to some embodiments of the invention, the method further comprises automatically ranking the beverage dispensing facilities according to the generated scores, and selecting for presentation the ranking of the beverage dispensing facilities.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings:

FIG. 7 is an exemplary screen shot of an exemplary graphical user interface for selecting, tracking and/or monitoring advertising profiles and/or price recommendation profiles, in accordance with some embodiments of the present invention;

FIG. 8 is a screen shot of an exemplary graphical user interface for tracking advertisement profiles, in accordance with some embodiments of the present invention;

FIG. 10 is an exemplary schematic comparing effects on a beverage brand and a competitive brand according to effects of price reductions and/or promotions, in accordance with some embodiments of the present invention.

DESCRIPTION OF SPECIFIC EMBODIMENTS OF THE PRESENT INVENTION

Figure 1:
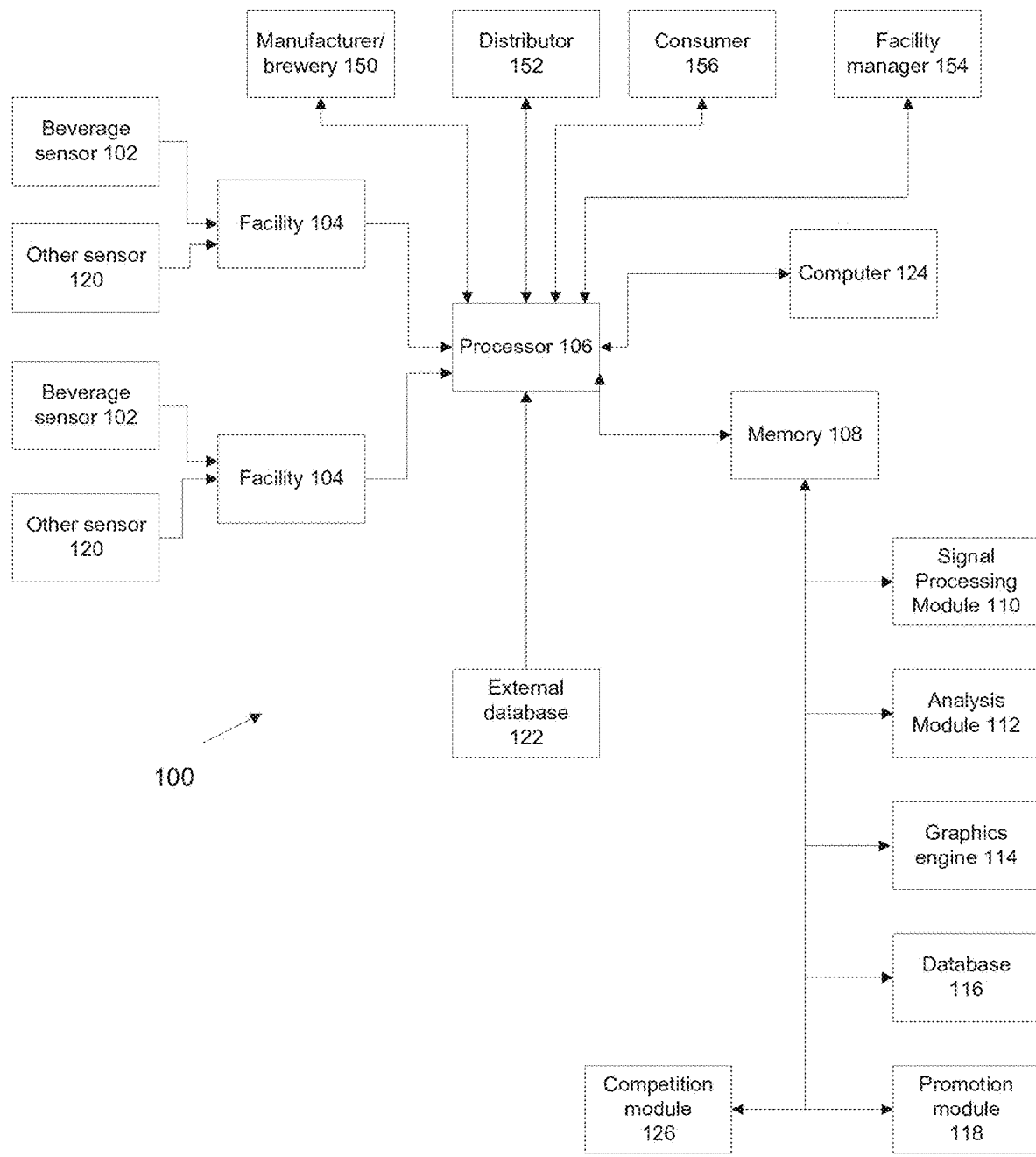
FIG. 1 is a block diagram of a system for analyzing beverage dispensing data and generating associated output, in accordance with some embodiments of the present invention.

The present invention, in some embodiments thereof, relates to a systems and/or methods for analyzing beverage dispensing data and, more particularly, but not exclusively, to systems and/or methods for analyzing dispensing data to provide price recommendations, quality measures and/or advertisements.

An aspect of some embodiments of the present invention relates to systems and/or computer-implemented methods of automatically generating a price recommendation profile for beverages dispensed at beverage dispensing facilities. The price recommendation may describe, for example, temporary changes in beverage prices. Optionally, the price recommendation profile includes a price reduction for one or more beverages. The price reduction may be provided as the price per liter and/or the price per glass, for the facilities (e.g., wholesale from the manufacturer) and/or for the clients (e.g., by the facilities). Alternatively or additionally, the price recommendation profile includes a price increase for one or more beverages. Alternatively or additionally, the price recommendation profile includes price maintenance for one or more beverages.

Optionally, the price recommendation profile includes temporary change(s) in price of beverages. Optionally, the price recommendation profile includes a price for the beverage for a future period in a certain time range. Alternatively or additionally, the price recommendation profile includes a current price for the beverage, to start immediately or during the same day. Alternatively or additionally, the price recommendation profile includes a price for the beverage for one or more specific dates, one or more days of the week, one or more holidays, correlated with one or more special events, or other specified times.

Alternatively or additionally, the price recommendation profile includes a geographical area, facility type and/or specific facilities. An example of a price reduction profile: reduce price of lager by 30% this coming Sunday from 20:00-21:30 for all bars on a main street and/or district.

Optionally, the price recommendation profile is generated according to analyzed past beverage dispensing patterns at one or more beverage dispensing facilities. Alternatively or additionally, the price recommendation profile is generated according to substantially current dispensing patterns. Alternatively or additionally, the price recommendation profile is generated according to forecasted beverage dispensing patterns.

Optionally, the price recommendation profile is generated according to the estimated number of patrons in the facility in the past, present and/or future. For example, the price recommendation profile is generated according to forecasted revenue per patron. For example, if few patrons are expected during a period of time, the price may be lowered to increase revenue per patron.

Optionally, the price recommendation profile is generated according to third party data, for example, current weather around the facility, weather forecast, upcoming special events planned by the city, upcoming special events such as the Superbowl, Stanley cup games, concerts, city festivals, or other data. For example, prices may be lowered on rainy days, and/or prices may be raised during the Superbowl.

Optionally, beverage dispensing is monitored during the implementation of the price recommendation profile. Optionally, a score (e.g., on a scale of 1-10) indicative of success or failure of the price recommendation profile is calculated. For example, a high score is assigned if revenue has been increased by the price recommendation, or a low score is assigned if beverage inventory is still high after the price recommendation. Optionally, a successful price recommendation profile (e.g., high score) is repeated at the same facility and/or implemented at another facility.

Optionally, different price recommendation profiles are generated for different facilities, for different beverages, for different manufacturers, for different geographical areas, and/or other patterns.

Optionally, the price recommendation profile is generated by comparing beverage dispensing patterns at one facility with other facilities, for example, with other nearby facilities, with other facilities of the same type, with facilities at different geographical locations, or other patterns. The comparison may help in determining which profiles (or parts thereof) to imitate and/or which profiles (or parts thereof) to avoid.

An aspect of some embodiments of the present invention relates to systems and/or computer-implemented methods of automatically monitoring quality of beverages at beverage dispensing facilities. Optionally, the monitoring is performed by the beverage manufacturer to quality control the beverages at the dispensing facilities.

Optionally, one or more events indicative of quality of beverages are detected. Optionally, a quality indication is generated according to the detected events, for example, a quality profile. The quality profile may be indicative of, for example, the detected event adding to quality or reducing quality. Alternatively or additionally, a quality score is calculated (e.g., 1-10) according to the quality profile and/or detected events. The quality score may be indicative of rank quality of the beer, for example, being a single value integrating the events and/or quality profile.

Optionally, changing and/or opening of a beverage container (e.g., beer keg) is detected. Optionally, the number of days that the beverage container has been open is determined. Optionally, the quality profile is indicative of the degradation of quality of the beverage with the number of days that the container has been open. Optionally, the quality score is correlated with the number of days, for example, the score decreases as the number of days increase.

Optionally, cleaning of the beverage container is detected, for example, flushing of the beverage lines with cleaning fluid. Optionally, proper cleaning is detected, for example, use of proper cleaning fluid and/or length of cleaning time. Optionally, the quality profile is indicative of following the maintenance cleaning schedule and/or following cleaning instructions. Optionally, the quality score is indicative of the quality effects of adherence to the maintenance schedule, for example, poor adherence is correlated with a low score.

Optionally, the temperature of the beverage container is detected, for example, the pattern of temperature over time. Optionally, the quality profile is indicative of the temperature pattern of the beverage, for example, if the beverage is always maintained below about 4 degrees Celsius.

An aspect of some embodiments of the present invention relates to systems and/or computer-implemented methods of automatically generating advertisements for specific types of beverages. Optionally, the advertisements are generated by the manufacturers of the beverages and directly provided to the consumers of the beverages. Optionally, the advertisements help to improve brewery-consumer relations. Optionally, a beverage advertisement profile is generated, for example, according to time ranges and/or dates. The beverage advertisement profile may be indicative of, for example, which advertisement is generated and/or when the advertisement is generated.

Optionally, advertisements are generated in real time according to current and/or historical beverage consumption patterns. Optionally, advertisements are generated according to geographical beverage consumption patterns. Optionally, advertisements are generated based on consumption patterns collected from a plurality of beverage dispensing facilities.

Optionally, changes in consumption patterns are monitored after the advertisements are provided to the consumers. Optionally, successful advertisement profiles are reused and/or unsuccessful profiles are avoided.

An aspect of some embodiments of the present invention relates to a system for monitoring and/or analyzing beverage dispensing patterns at one or more dispensing facilities. Optionally, data is collected from different facilities and processed together to provide overall beverage consumption patterns, for example, according to: time of day, day of the week, special events, holidays, type of beverage, brand of beverage, quality of beverage, promotions, advertisements, price reductions, contests, geographical variations, weather patterns, or other patterns.

Optionally, the system includes beverage dispensing sensors for generating signals indicative of dispensing of beverages from large containers, for example, beer from kegs.

Optionally, the sensors are in electrical communication with a local processor for converting the signals into a form suitable for transmission over a wired and/or wireless network. Optionally, the processor is in electrical communication with a network interface for accessing the network. Optionally, facilities contain additional sensors that generate signals associated with dispensing of beverages, for example, people counting sensors, weather sensors and/or beverage temperature sensors.

Optionally, each facility generates signal data that feed into another processor (e.g., remote) that analyzes the combined data from the individual facilities. Optionally, the remove processor receives and/or obtains associated signals from the facilities and/or from external sources (e.g., web servers).

Optionally, users (e.g., manufacturers, breweries, consumers, facilities) access the remote server (e.g., using Smartphones with secure wireless remote access) to obtain the analyzed beverage dispensing data, pricing data, promotional data and/or quality reports.

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

Figure 2:
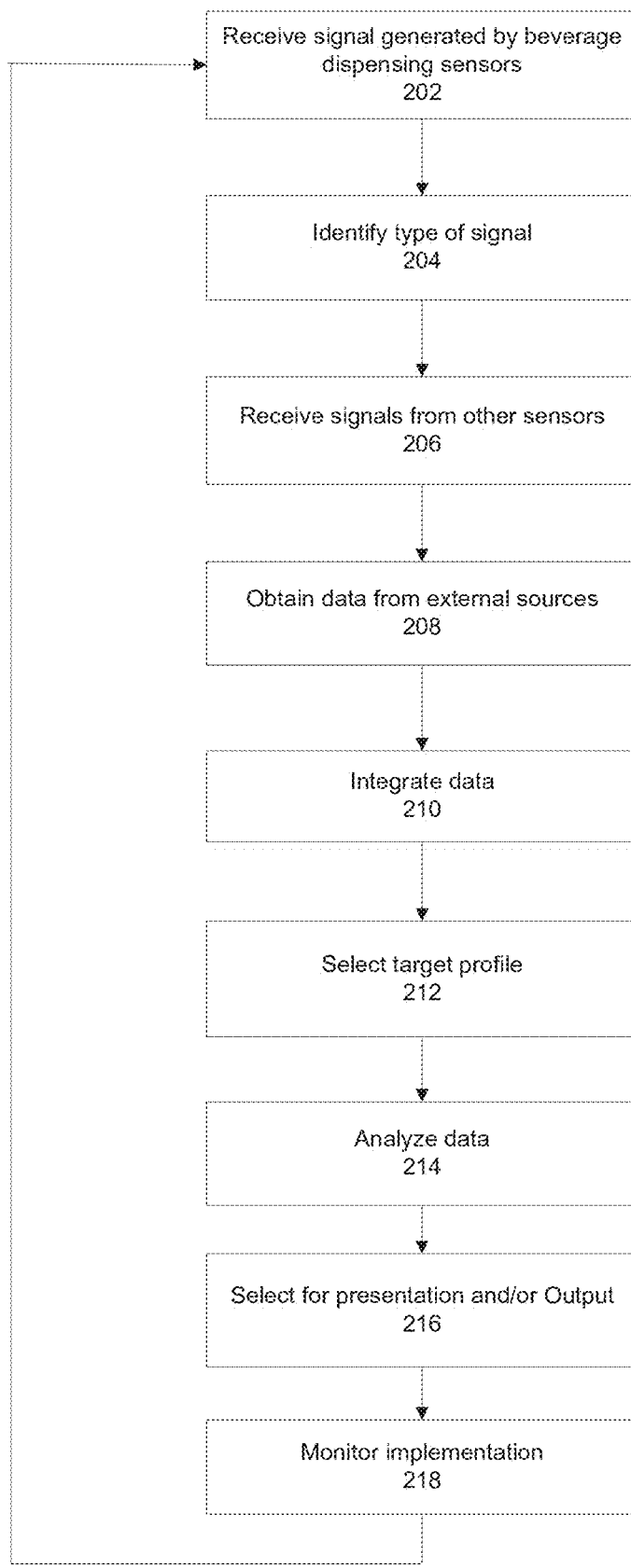
FIG. 2 is a flowchart of a computer-implemented method for analyzing beverage dispensing data and generating associated output, in accordance with some embodiments of the present invention.

Referring now to the drawings, FIG. 1 illustrates a system 100 for automatically analyzing beverage dispensing patterns, in accordance with some embodiments of the present invention. Reference is also made to FIG. 2, which is a computer-implemented method of automatically analyzing beverage dispensing patterns, in accordance with some embodiments of the present invention. The method of FIG. 2 may be performed by system 100 of FIG. 1. System 100 and/or the method may collect consumption and/or dispensing data in real-time, analyze the data for patterns and/or present the data as insights for decision making for manufactures (e.g., manufacturers such as breweries 150, distributors 152, facility managers 154 such as bar owners and/or beverage consumers 156).

Optionally, at 202, signals generated from one or more sensors 102 are received. Sensors 102 are designed to generate signals in response to beverage dispensing and/or consumption. For example, sensors 102 are flow sensors installed in parallel with beverage lines connecting large beverage containers (e.g., kegs, barrels) with taps, for example flow sensors available from the company Weissbeerger™. Other suitable sensors may be used.

Optionally, sensors 102 are installed per container and/or per tap in a beverage dispensing facility 104. Facilities 104 are, for example, bars, restaurants, serving stations at sport stadiums, sports bars, portable serving stations such as used during outdoor events, or other beverage serving locations. Optionally, sensors 102 are installed to capture signals of beverage dispensing, per beverage and/or for the facility. The total number of sensors 102 per system 100 is, for example, about 100-1000, or about 1001-5000, or other higher or lower ranges, for example, varying with the number of facilities and/or size of facilities.

Optionally, sensors 102 are installed in a representative statistical sampling manner for collecting consumption data of beverages in beverage dispensing facilities, for example, selected facilities within a geographical area. Alternatively or additionally, sensors are installed to capture an absolute picture; each facility of interest has installed sensors.

Examples of beverage dispensing facilities include bars, pubs, hotels, restaurants, sports bars, or other facilities where beverages are dispensed. Dispensed beverages may be alcoholic, for example, beer, wine, liquor and/or spirits, or non-alcoholic, for example, coffee, soft drinks, and/or syrups. Beverages may be dispensed from a larger container through a tap, for example, draught beer. The containers may be large enough to hold multiple servings of the beverage, for example, kegs or barrels.

Optionally, signals are sent to processor 106 for further processing. Each facility may have its own processor 106, and/or multiple facilities may share one processor 106. Alternatively or additionally, as described with reference to FIG. 6, there are two types of processors, multiple processors at the facility level that communicate with a central processor. Processor 106 may communicate with sensors 102 by wired and/or wireless connections. Processor 106 may connect to the central processor, by wired and/or wireless connections, for example, by WiFi™, wired LAN, 3G, and/or other suitable connections. Processing and/or all analysis may be done remotely, for example, by the central processor (instead of processor 106), or processor 106 may be remotely located.

Optionally, processor 106 is in electrical communication with a memory 108 having a storage database 116 for storing raw signals, filtering signals, processing signals, analyzing results, initialization data, facility parameters, and/or other data.

Optionally, at 204, the signals generated by the sensors are identified and/or classified, for example, by a signal processing module 110. Module 110 identifies signals as being related to beverage dispensing, quality associated activities (e.g. beer line cleaning, empty keg gas flow, or other activities), noise and/or other activities.

Signals related to beverage dispensing may be analyzed to generate price recommendation profiles and/or advertising profiles, as described herein. Signals related to quality related activities may be analyzed to generate quality indicators, as described herein.

Optionally, module 110 performs signal processing functions on the raw signals, for example, filtering the signals, removal of line noise, analogue to digital conversion and/or other signal processing functions. Optionally, module 110 transforms the signals into a format suitable for processing by processor 106.

Optionally, processor 106 is in electrical communication with an enterprise resource planning (ERP) system, so that analysis of beverage consumption may share data with the ERP system.

Optionally, at 206, data is collected from other sensors 120, for example, non-beverage dispensing sensors. Optionally, other sensors 120 are people counter sensors for estimating and/or counting the number of clients in the facility. People may be counted in real-time. Examples of people counter sensors include: a computer vision system to count the number of people in pictures of the facility, a manual clicker-counter activated by a guard at the door, the counter being in electrical communication with processor 106, an infrared beam across the entrance, a thermal imaging camera, and/or other technique.

Optionally, at 208, data is collected from third party and/or external sources 122, for example, from the internet. Alternatively or additionally, data is collected from sources associated with the beverage manufacturer, distributor, facility and/or consumers, for example, from confidential databases. Examples of collected external data include: weather, city events, holidays, season, analysis of social media, analysis of traffic data of related website (e.g., Google™ Analytics), and/or events in nearby facilities (e.g., concerts, baseball games). Examples of collected business related data include: cost of beverages, facility operating costs, employee work schedules, employment regulations, and/or other data related to the facilities and/or manufacturers. The business related data may also be referred to herein as external source data.

Optionally, at 210, data is integrated and/or organized at the facility level. Alternatively or additionally, data is integrated and/or organized at a central location for multiple facilities.

For example, data is first collected from local sensors for each facility. The data is identified, filtered, tagged and/or modified for sending to the central location for processing. Data arriving from multiple facilities is combined and processed at the central location. Data from external sources may be collected at the facility level and/or at the central location.

Optionally, at 212, a target profile is received, for example, from a user. Alternatively, no specific target profile is received, and the system proceeds to analyze to optimize data in a best-effort manner.

Target profiles may be associated with the price recommendation profile, with the advertising profile, with the quality scores and/or with other factors.

The target profile includes, for example, increase revenue, increase volume of beverage dispensed, increase sales, analyze effectiveness of media advertisements, decrease inventory to a predefined level, improve quality scores, minimize waste, minimize sales of competitors, increase profits, other variables, and/or combinations thereof. At 214, the beverage dispensing data generated by the sensors (block 202) is analyzed. Optionally, the data is analyzed for statistical patterns. Optionally, data is analyzed for statistical patterns of beverage consumption. Analysis is performed, for example, using suitable statistical methods.

Optionally, data from other sensors (block 206) is analyzed together with the beverage dispensing data. Alternatively or additionally, data from external sources (block 208) is analyzed together with the beverage dispensing data.

Optionally, data is analyzed for monitoring purposes, for example, trends are generated and shown to the user. Alternatively or additionally, data is analyzed to generate a price recommendation profile. Alternatively or additionally, data is analyzed to generate a beverage advertising profile. Alternatively or additionally, data is analyzed to generate a quality profile. Alternatively or additionally, data is analyzed to generate forecasts.

Optionally, weights are assigned to the collected data. Weights may be assigned, for example, by the user, automatically assigned by software and/or preset by the manufacturer of the system. Optionally, weights are automatically assigned according to the degree of identified correlations with the beverage dispensing data. For example, weather may have relatively high weights, whereas reviews on a website may have relatively lower weights. Optionally, weights are assigned to data collected from other sensors and/or third party data, but not to the beverage sensor data.

Optionally, processor 106 executes instructions by an analysis module 112 for analyzing the beverage dispensing data collected from the sensors.

Examples of analysis patterns of data by analysis module 112 include:

Data on the dispensing patterns of beverage containers during a period of time, for example, from installation until empty. The data may help determine the rate of consumption, and prices may be lowered if the rate is too slow.

Data on the dispensing of each beer brand sold by a brewery and/or by specific bars, for example, per day of the week, per hour of the day and/or per minute of the hour. Price reductions and/or other promotions may be offered, for example, for beer types that are not popular, for beer brands with high inventory, for beer brands being phased out, and/or other reasons.

Dispensing data of a brand and/or brewery offerings may be correlated with other data, for example, one brand to another brand, weather, advertisements, market trends, or other data such as data received from third party sources and/or other sensors. The correlations may help predict effects, for example, lowering prices if a rainy day is expected, or lowering price of one brand of beer to increase sales of a correlated brand. Previously unrecognized statistical correlations may be discovered and utilized to increase sales expectancy, for example, correlations between different bars in the city, for example, consumers may go bar hopping between several bars in one night. Prices may be lowered by all the correlated bars together to increase sales. The breweries may reorganize and/or optimize beer infrastructure installation in bars based on the data. In another example, beer brands may be consumed differently in urban bars versus suburban bars. Different beer brand mixes may be offered at the different bar types based on the correlated data. In another example, beer sales may be increased on nights during which concerts are being held.

Forecasts may be made using the data, for example, using regression models, based on or more collected data parameters. For example, forecasts may be made of consumption on an hourly basis for each tap, for each beer type, for each bar, within a specific region, and/or other variables. Alternatively, forecasts are made of the traffic of patrons in the facility, with consumption estimated according to the traffic.

Examples of monitored data include: market share of beer brands, beer brand sales, and/or beer brand volume (e.g., liters), any of which may be displayed for specific time frames, and/or geographical regions.

Combining data from the people counter sensor with data from the dispensing sensor, for example, comparing number of people with volume of beverage poured. Analysis may provide, for example, average consumption per capita, which may be used as a measure to compare and/or audit between brands and/or between bars. The per capita measure may provide a better picture than the absolute volume dispensed.

Monitoring, analysis and/or recommendations may be performed in real time, for example, instantaneous, for the last about 1 minute, about 5 minutes, about 15 minutes, about 1 hour, about 2 hours, about 4 hours, about 8 hours, the day, or other time periods.

Historical data may be analyzed according to, for example, a week, a day of the week, a date of the year, an hour, a holiday, a special event or other significant periods and/or time ranges thereof. Data may be analyzed per type of facility, for example, for restaurants, for bars, for sports bars, for clubs, for hotels, or other facilities. Data may be analyzed per geographical area, for example, globally for different countries, per country, per county, per city, per neighborhood, per street, per facility, or other facilities. Data segmentation may be combined, for example, all bars on a certain street during Superbowl Sunday from 8:00-9:00 pm.

Estimating draught beer waste, for example, caused by bartenders offering free drinks, unprofessional beer pouring (e.g., over pouring of foam), beer line cleaning and/or theft.

Waste patterns may be monitored. Alternatively, a fixed figure is used for the waste, for example, about 17%-20%. Optionally, the dispensing data is corrected for the estimated waste to arrive at consumption data. Alternatively, the dispensing data is not correct and is assumed to equal the consumption data.

Optionally, the analysis is performed in order to achieve the target profile (block 212). Optionally, the price recommendation profile is generated with the goal of trying to achieve the target profile. Alternatively or additionally, the advertisement profile is generated with the goal of trying to achieve the target profile. Alternatively or additionally, instructions are generated to help achieve the target profile of the quality measure.

Optionally, the data is analyzed to detect beverage tasting. Beverage tasting may reduce profits as beverages are dispensed without charge. Small amounts of free beverages may add up to significant volumes. Optionally, module 112 analyses data for each tap to identify the tap status (e.g., tap is running, tap is being opened, tap is being closed). For example, records of all pours from the tap are identified. Based on the monitored data, pours (e.g., consecutive) are matched and/or clustered to the appropriate service size, for example, according to standard beer glass sizes, for example, about 0.5 liter, about 0.3 liter, or other sizes. Different sizes of serving glasses may be identified. Data may be classified and/or analyzed according to the different sizes, for example, revenue due to sales of 0.5 liter beer vs. 0.3 liter beer, and/or different promotions for different sizes of beer glasses. The analysis may be based on physical laws, for example, acceleration and/or deceleration in pouring pace and/or on statistical analysis. The sequential pour records may be brought together and optionally analyzed with further data to determine if each record has characteristics of a tasting or not.

Optionally the data is analyzed to detect cannibalization of competitors, for example, by a competition module 126. Alternatively or additionally, cannibalization of a different brand of beer by the same manufacturer is detected. Optionally, the analysis is performed favoring a reduction of market share of the competitor, for example, over higher profit margins. Optionally, module 126 is executed in a mixed facility, offering two or more different types of beverages. Optionally, the analysis is performed to deliberately cannibalize a brand which belongs to one manufacturer in favor of another brand which belongs to another manufacturer. Alternatively, the analysis is performed to deliberately cannibalize one brand over another, both brands being offered by the same manufacturer. Optionally, the cannibalization increases bar and/or manufacturer profits.

Optionally, the cannibalization analysis is performed using calculations of beverage consumption patterns, for example, as described herein. Optionally, a different set of constraints and/or target profiles are defined, so that the recommended price reduction profiles, advertising profiles and/or other factors increase profits while cannibalizing other brands. FIG. 10 is an exemplary schematic comparing a beverage brand to a competitive brand according to effects of price reductions and/or promotions (e.g., price reduction profile), in accordance with some embodiments of the present invention. Optionally, the effects of different promotions on brand X and/or brand Y are determined, for example, as described herein. Optionally, the price reduction profile and/or promotion that would increase the profits for the bar and/or manufacturer selling brand X while decreasing the sales of brand Y is selected, for example, shown as marked in the circle.

Optionally, the data is analyzed to generate scores for at least some or each of the beverage dispensing facilities. Optionally, the scores are generated for points of sale at the beverage dispensing facilities, for example, for each point of sale for each facility. Points of sale are, for example, each employee, each cash register, each tap, or other points. Alternatively or additionally, the scores are generated for the facility as a whole, for example, combining data from all the points of sale together.

The scores may be indicative of, for example, revenue, sales, current promotions, current discounts, or other parameters are described herein.

Optionally, the beverage dispensing facilities are ranked according to the generated scores. Alternatively or additionally, the points of sale within each facility are ranked. Alternatively or additionally, the points of sale within all facilities are ranked.

The scores and/or rankings are selected for presentation and/or outputted, as described herein. The scores and/or rankings may be used, for example, to compare bars to each other, to compare employees to each other, to compare beer taps, or other comparisons. The comparisons may be used to determine winners of contests, for example, contests between bars as described herein.

At 216, the analyzed data is selected for presentation. Alternatively or additionally, the analyzed data is provided as an output. For example, data is sent to another computer for further processing, data is stored on a memory, data is printed and/or data is displayed on a screen, for example, on a screen of a computer 124 connected to the web and/or on the screen of a mobile device. Computer 124 may also include input elements for a user to enter input into processor 106, for example, a touchscreen, a keyboard, a mouse, voice recognition, and/or other elements.

Optionally, a graphic engine 114 contains program instructions for graphically presenting the analyzed data, for example, using graphs, tables, charts, text, images, or other formats.

Optionally, the analyzed data is displayed in a user interface (UI) designed for viewing by a potential customer 156 that can enter a bar and order drinks. For example, a web-page, Smartphone applications, a Facebook page, text messages, emails, phone calls, or other method of notifying customers 156. Optionally, the UI displays current promotions offered by bars subscribed to the system. Optionally, customers 156 may browse all promotions to select ones they are interested in. For example, customer 156 may enter the UI to see the best discount offered in real-time in his/her geographical region (e.g., Berlin) according to specific bars. Alternatively or additionally, selected promotions are sent to individual users, for example, according to preset parameters, geographical location, history of selection of prior promotions, demographics, or other factors.

Optionally, the promotion is promoted by the manufacturer (e.g., brewery), optionally, without intervention of the facilities (e.g., bars).

Optionally, a promotion module 118 stores program instruction for generating an advertisement profile, as discussed in more detail with reference to FIG. 5.

Optionally, a client application notifies a client with promotional content (e.g., generated according to the advertising profile, as described hereinabove) according to promotion of a favorite brand of the client, for example, the application sends messages to a mobile device according to predefined settings for the favorite brands.

Optionally, the client application matches between a suitable bar that has a suitable profile and the client that has a suitable profile. For example, bars having the best promotion based on the analysis are matched with the client based on the brand of beverage that the client likes. Bar matching may be performed in real time. Bar matching may be performed according to proximity of client and bar locations.

Optionally, a report is generated. Optionally, the report contains the location based matching of the best bars on the gathered data, for example, the best selling bar. Optionally, the report contains identified trends, for example, as described hereinabove.

Optionally, at 218, the process is repeated to monitor the response to implemented actions. For example, to monitor the effects of price reductions according to the generated price recommendations, to monitor effects of advertising (e.g., direct brewery to consumer relations) according to the advertising profile, to monitor actions in response to the quality measures (e.g., improved cleaning schedule, faster keg turnover), and/or any other actions taken in response to the analyzed data.

Optionally, a beer pulse is taken, to determine the real-time effects of advertisements in media on beer consumption on-trade.

Optionally, system 100 provides dynamic pricing, for example, real-time price adjustments (e.g., discounts, premiums) according to current and/or past beverage dispensing patterns.

Optionally, system 100 provides revenue management, for example, by dynamic price adjustments and/or advertisements. Optionally, system 100 provides operations optimization, for example, reducing losses, and/or replacing inventory as required.

Optionally, system 100 provides automatic leak detection. For example, the volume of a dispensed beverage is compared to the volume of received inventory. For example, if a 164 liter beer barrel has been emptied, but only 130 liters have been recorded as being dispensed, a leak of 34 liters may be detected.

Optionally, system 100 provides delivery scheduling. For example, the volume of a dispensed beverage is monitored and compared to the existing inventory. When the dispensed amount is below a threshold, the system may trigger an automatic request with the manufacturer to reorder inventory, and/or the system may send a message to the facility owner that inventory is low and requires reordering. Optionally, the system may forecast remaining inventory over a certain future period of time (e.g., according to beverage consumption patterns).

Figure 3:
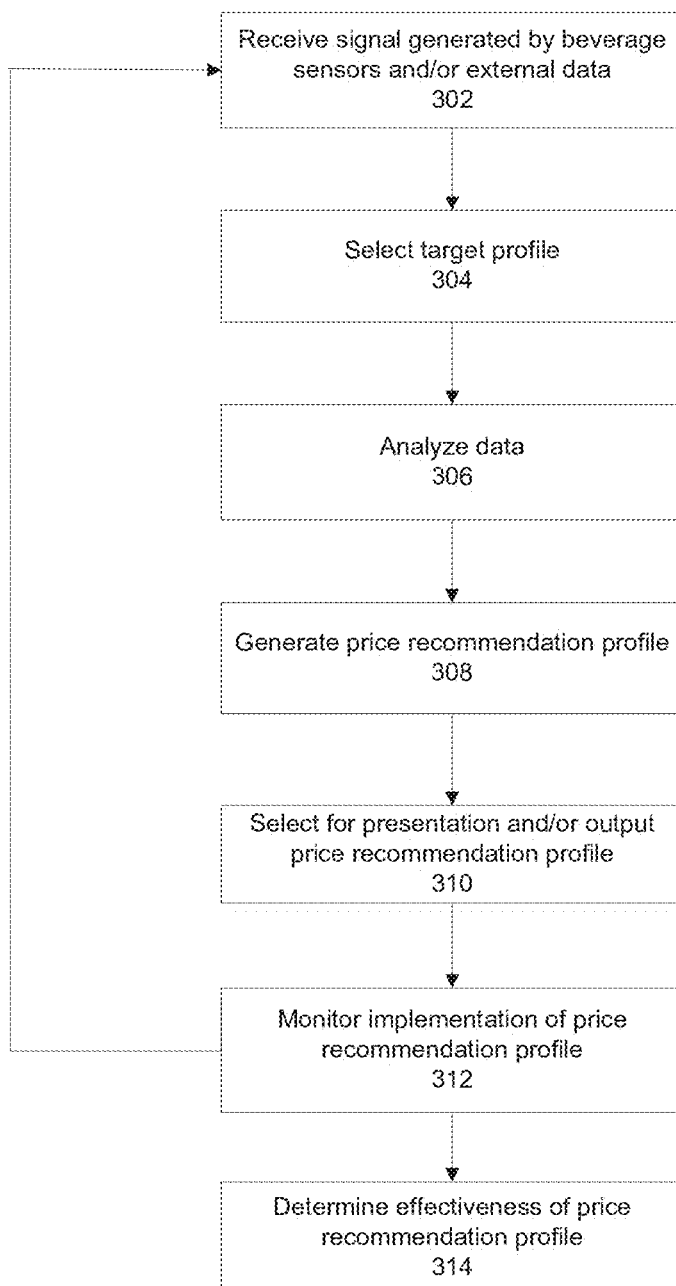
FIG. 3 is a flowchart of a computer-implemented method for generating price recommendations based on beverage dispensing data, in accordance with some embodiments of the present invention.

Reference is now made to FIG. 3, which is a flowchart of a computer-implemented method of generating beverage price recommendations according to beverage dispensing and/or consumption data, in accordance with some embodiments of the present invention. The method may be implemented by system 100 of FIG. 1.

Optionally, at 302, signals are received from beverage dispensing sensors and/or other sensors, for example, as described with reference to blocks 202 and/or 206 of FIG. 2. Alternatively or additionally, data is collected from external sources, for example, as described with reference to block 208 of FIG. 2.

Optionally, at 304, a target profile is received, for example, as described with reference to block 212 of FIG. 2.

At 306, the received data is analyzed, for example, as described with reference to block 214 of FIG. 2.

At 308, a price recommendation profile is generated. Optionally, the price recommendation profile is generated by the beverage manufacturer for implementation by the facilities (in sales to consumers). Alternatively or additionally, the price recommendation profile is generated by the manufacturer for implementation by the manufacturer (in bulk sales to the bar). Alternatively or additionally, the price recommendation profile is generated by individual facility managers for implementation by the facility (in sales to consumers).

Optionally, the price recommendation profile is generated in response to the target profile. Implementing the price recommendation profile may achieve the target profile. Alternatively, the price recommendation profile is generated in a best-effort manner, for example, using a mathematical tool to calculate the most profitable way to incentivize all beer brands in the bar per day.

Optionally, the price recommendation profile is generated in response to, for example, consumption forecasts for each tap, beverage costs per liter, beverage revenue per liter, mix promotion type (e.g., 50% on second glass, 25% off), historical effects of promotion on consumption, and/or other factors.

Optionally, the price recommendation profile is generated in response to constraints that may help prevent cannibalization.

Optionally, at 310, the price recommendation profile is selected and/or provided, for example, as described with reference to block 216 of FIG. 2.

Optionally, one price recommendation profile is selected, for example, manually by the user and/or automatically by software. Alternatively, two or more price recommendations profiles are selected. For example, a first price recommendation for a discount, and a second price recommendation for content of an internal promotion. Optionally, the system ensures that the promotions are chosen, for example, so that promotions do not overlap and lead to larger discounts than planned, contradict each other and/or cannibalize other products.

Optionally, at 312, the effects of implementing the price recommendation profile are monitored, for example, as described with reference to block 218 of FIG. 2.

Optionally, the method is repeated so that data is updated, constantly and/or periodically.

Optionally, at 314, the most effective price recommendation profiles are determined. Alternatively or additionally, the degree of effectiveness of the price recommendation profiles is determined, for example, for the ability to increase revenue, sell-off remaining inventory, or other goals.

Optionally the system learns the most effective price recommendations profiles through the iterative process. Optionally, incremental changes in the price recommendation profile are made, monitored, and the price recommendation profile is changed again in the same direction (e.g., price decrease), maintained, or changed in an opposite direction (e.g., price increase).

Optionally, the system performs cross learning by learning from other implemented price recommendation profiles, for example, at other bars, by other breweries, for other types of beer, or other profiles.

Optionally, the most cost-effective incentives given by breweries (or other manufacturers) to bars (or other facilities) are determined. Optionally, the most effective profiles are determined for defined time frames, geographical regions, facility types, or other classifications.

Optionally, the price recommendations of the method achieve similar or higher revenue and/or sales as compared to global price reductions without the method. For example, reducing prices for specific times of the day instead of for a month.

Similarly, the most effective quality measures may be determined and/or the most effective advertising profiles may be determined.

An example of the application of the method: for Berlin, a buy-one-get-one-free incentive increased sales by 21% between 18:00-19:00, whereas a 50% discount only increased sales by 17.5% in the same time frame. After 20:00, a 50% discount caused an increase in sales of 35% in comparison to only a 5% increase for the buy-one-get-one-free incentive. Such a report may change the way bars and/or breweries incentivize consumers in a more efficient and/or cost effective way.

Figure 4:
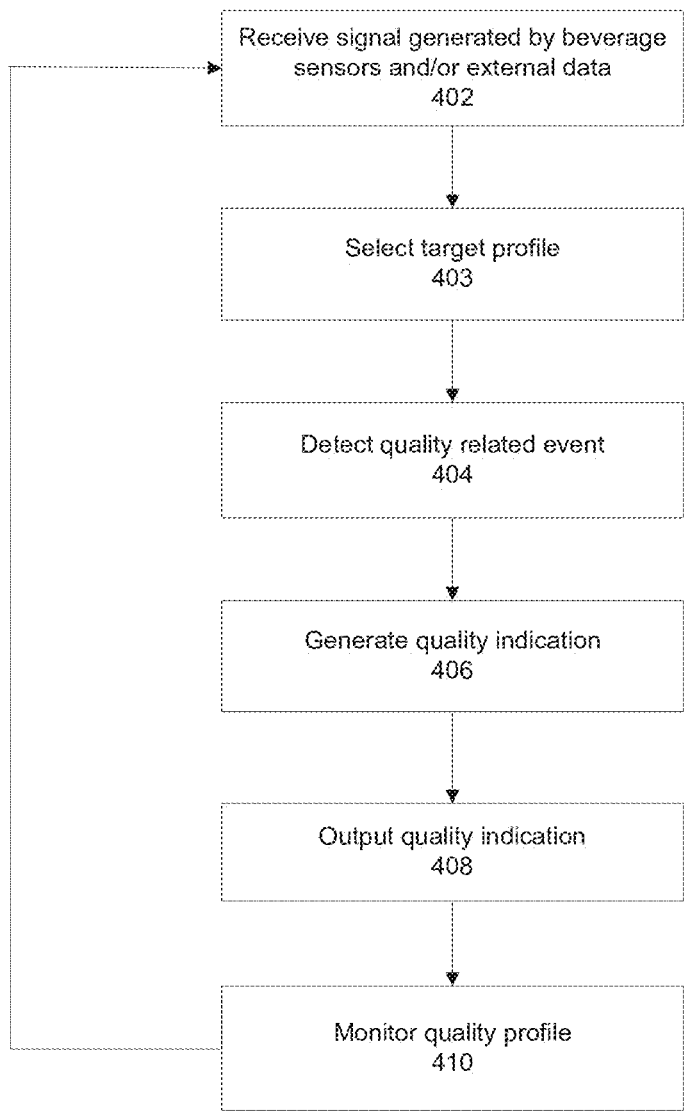
FIG. 4 is a flowchart of a computer-implemented method for generating quality measures, in accordance with some embodiments of the present invention.

Reference is now made to FIG. 4, which is a flowchart of a computer-implemented method of generating a quality measure indicative of beverage quality, in accordance with some embodiments of the present invention. The method may be implemented by system 100 of FIG. 1.

Optionally, the method is used by beverage manufacturers (e.g., breweries) to remotely, continuously and/or in real-time perform quality control over their beverages (e.g., beer) in multiple facilities.

At 402, signals are received from one or more sensors. Optionally, signals are received from the beverage flow sensors. Alternatively or additionally, signals are received from one or more other sensors measuring parameters indicative of beverage quality, for example, temperature sensors generating signals indicative of the temperature of the beverage, color sensors generating signals indicative of the color of the beverage, or other sensors. Alternatively or additionally, data is received from external sources, for example, a maintenance schedule is downloaded from the beverage manufacturer server and/or maintenance guidelines are downloaded from a government agency server.

Optionally, at 403, a target profile is selected, for example, as described with reference to block 212 of FIG. 2.

At 404, the signals are analyzed to detect events associated with quality of the beverage.

Optionally, signals are analyzed to detect keg replacement events. The number of days that each keg was open may be determined. Keg replacement may be detected by detecting changes in gas and air mix in the beer line due to disconnection of the coupler from the keg. Air may be detected by the sensors, for example, due to changes in flow rate in the beer line. Changes in the flow rate may be detected, for example, by statistical process control (SPC) analysis methods. The system may go through records of each tap, defining the average amount of a single pour and/or standard deviation, and identify which records excess process control limits. Alternatively or additionally, keg replacement is detected by color detection, for example, using a color sensor. The replaced beer may have a different color than the original beer.

Alternatively or additionally, signals are analyzed to determine sanitation events, for example cleaning patterns. Sanitation of beer lines may be detected, for example, by signals analyzed to detect the following pattern of events: the beer line being drained from beer, the beer line being filled with sanitation fluid for about 5-20 minutes, washing the beer line with water, and refilling the line with beer.

The sanitation event may be compared against a required cleaning and/or sanitation schedule to determine if proper sanitation maintenance is being performed. For example, beer lines need to be sanitized every couple of weeks to preserve a high quality of beer taste and/or to meet the food and beverage standards.

At 406, the detected events are combined and/or correlated into a quality indication, for example, a quality profile and/or quality score. For example, correlating and/or combining the number of days that a keg has been opened with temperature of the beer inside the keg with sanitation events may provide a score of the beer quality level. Scores may be calculated in real-time and/or trends in scores may be tracked.

At 408, the quality indication is provided, for example, as described with reference to block 216 of FIG. 2.

Optionally, recommendations are outputted to the user associated with the quality profile. For example, if the quality profile is low due to poor adherence to the maintenance schedule, the user may receive a message indicating deficient areas.

Optionally, the quality is monitored, for example, as described with reference to block 218 of FIG. 2.

Optionally, changes in the quality indication are monitored, for example, to detect an increase in quality, degradation in quality and/or maintenance in quality.

Optionally, the recommendations provided to improve quality are monitored to detect if the recommendations have been followed.

Figure 5:
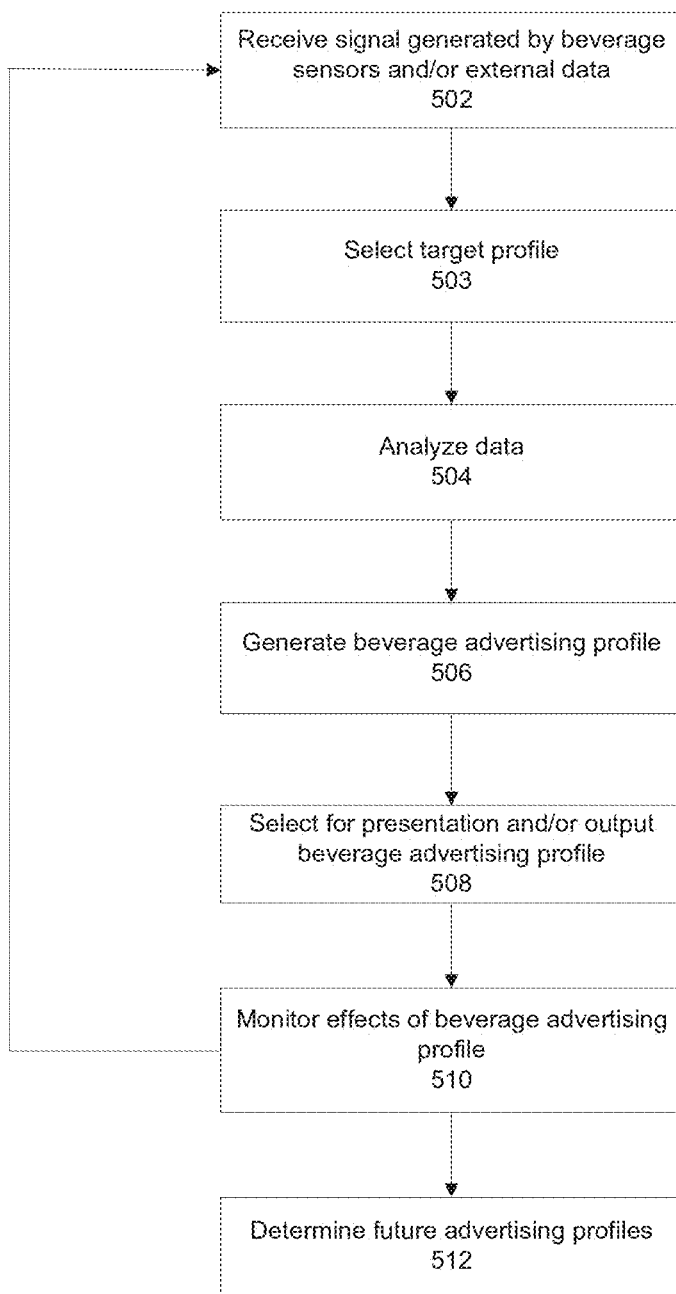
FIG. 5 is a flowchart of a computer-implemented method for generating advertisements and/or promotions based on beverage dispensing data, in accordance with some embodiments of the present invention.

Reference is now made to FIG. 5, which is a flowchart of a computer-implemented method of generating a beverage advertising profile according to beverage dispensing and/or consumption data, in accordance with some embodiments of the present invention. The method may be implemented by system 100 of FIG. 1.

At 502, signals from sensors and/or data from external sources are received, for example, as described with reference to blocks 202, 206 and/or 208 of FIG. 2.

Optionally, at 503, a target profile to be achieved by the generated beverage advertising profile is selected, for example, as described with reference to block 212 of FIG. 2.

At 504, the analysis is performed by the manufacturer (e.g., brewery) for beverages (e.g., beer) dispensed at multiple facilities. The multiple facilities may be owned and/or operated by different entities, for example, under different ownerships.

Additional details of analysis are described, for example, with reference to block 214 of FIG. 2.

At 506, the advertisement profile is generated by the brewery and delivered directly to the beverage consumer. Optionally, the advertisement profile is delivered without intervention by the bars. Alternatively, the advertisement profile is generated by the brewery and delivered to the bars for implementation.

Optionally, the advertisement profile is generated by a promotion module 118 of FIG. 1. Optionally, module 118 enables the brewery to configure and/or publish campaigns directly to bars and/or consumers in order to affect consumption and/or sales.

Optionally, the brewery generates advertising profiles to perform focused and/or efficient promotions.

Optionally, the advertisement profile contains details of a contest. The contest campaign may enable the brewery to declare a contest between taps and/or bars during specified time frames and/or for specific brands. Examples of advertising profile parameters for the contest campaign: date (e.g., start-end), time (e.g., start-end), brand (i.e., specific beverage brand and/or type that the campaign is focused on), measure (i.e., the way the bars will be measured, for example, liters poured, liters per seat, liters per capita, % increase, or other measures), prize (i.e., prize offered to the winning bars).

Alternatively or additionally, the advertising profile contains details of a discount. The discount campaign may enable the brewery to discount and refund the bar for the volume of beverage poured for a specific brand between the pre-defined time frames. Examples of advertising profile parameters for the discount campaign: date (e.g., start-end), time (e.g., start-end), brand, discount (i.e., % discount to refund the bar).

Optionally, a single advertisement profile is periodically generated. Alternatively, several advertisement profiles are periodically generated. Alternatively or additionally, advertisement profiles (one or several) are continuously generated. The generation may be prompted by detected changes in conditions, for example, upcoming holidays, weather changes, inventory levels, consumption changes, or other factors. Alternatively, generation may be prompted manually, for example, by management according to changes in business plans. Similarly, the generation of price recommendation profiles (e.g., described with reference to FIG. 3) and/or quality scores (e.g., described with reference to FIG. 4) may be prompted.

At 508, the results of the advertisement profile are selected and/or outputted.

The brewery may decide which advertisement profiles to implement. The selected advertisement profiles are directly sent to bars and/or consumers, for example, to mobile devices, using phone calls, text messages or other methods. Alternatively or additionally, the selected profiles are presented in a user interface accessible by interested users, for example, as describe with reference to box 614 of FIG. 6.

Attention is now diverted to FIG. 7, which is a screen shot of an exemplary graphical user interface for selecting, tracking and/or monitoring advertising profiles, in accordance with some embodiments of the present invention. The graphical user interface may also provide selecting, tracking and/or monitoring of selected price recommendation profiles. Optionally, selection of the advertising profile mode generates recommendations for price discounts according to analyzed beverage dispensing patterns, as described herein. Optionally, selection of the advertising profile mode overrides the price recommendation mode.

Optionally, at 510, the results of the advertisements profile are monitored.

Optionally, the manufacturer detects if the advertisement profile (e.g., promotion) generated by the manufacturer has been implemented and/or presented by the facilities to the end users. Optionally, real time beverage consumption data is analyzed to determine if there is an effect due to the promotion or not.

Optionally, an approval that the promotion has been implemented is manually provided by the facility manager, for example, by pressing a button on a message that generates a return confirmation message. Alternatively or additionally, the implementation is automatically detected according to consumption patterns correlated with the expected implementation of the promotion. Changes in consumption patterns may be analyzed to deduce whether the promotion has been implemented or not for each facility.

Figure 9:
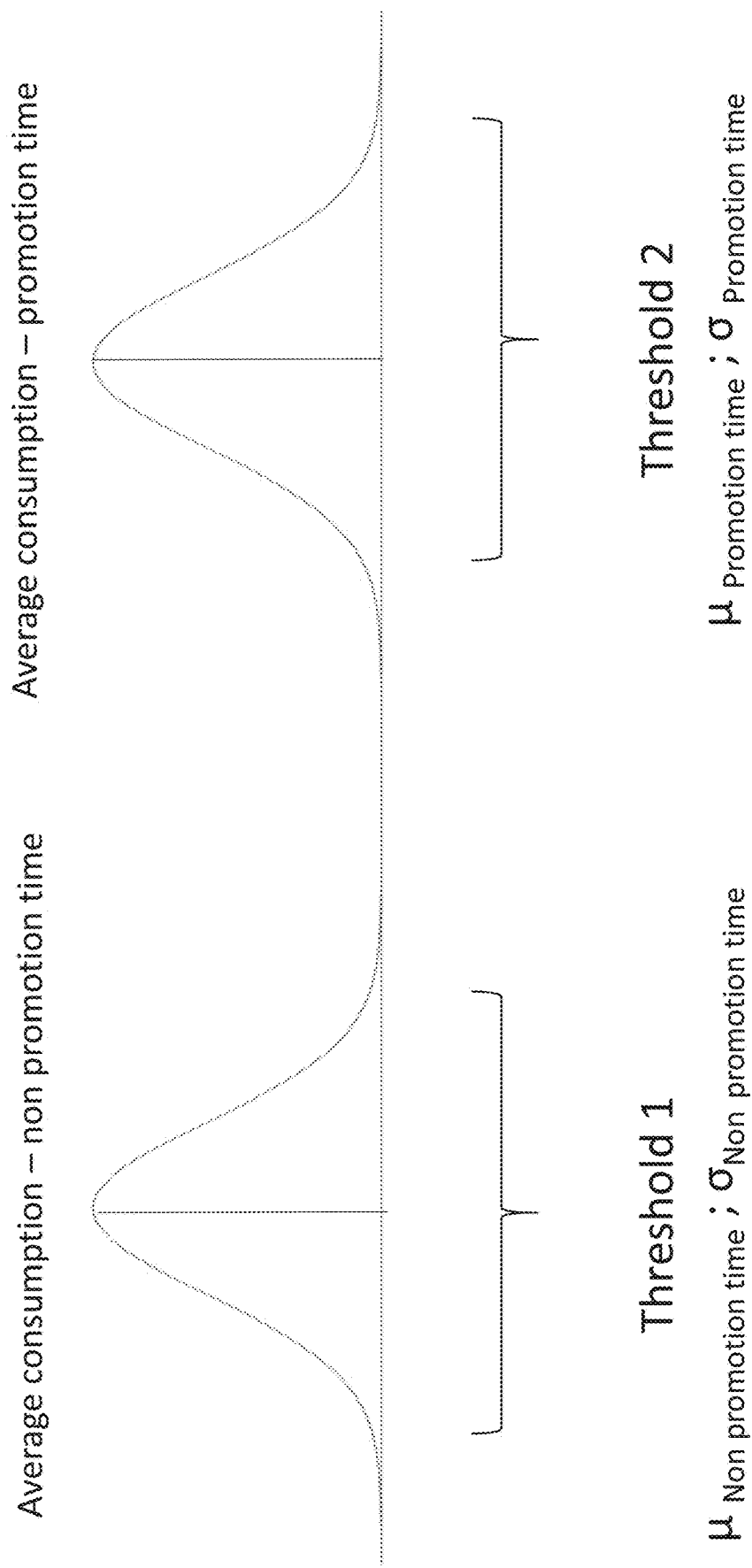
FIG. 9 is an exemplary schematic comparing a consumption pattern with and without a promotion, in accordance with some embodiments of the present invention.

FIG. 9 is an exemplary schematic comparing a consumption pattern without the promotion (left side) and with the promotion (right side), in accordance with some embodiments of the present invention. The patterns may be generated, for example, using predictive analysis tools that define the consumption forecast as a stochastic datum, for example, for each tap and/or brand per bar on a daily and/or hourly basis. Optionally, the predictive analysis tool calculates the expected forecast with the implemented promotion effect (right side) and/or without the implemented promotion (left side).

Optionally, during and/or after the promotion has been scheduled to start, the analysis tool determines if the observed consumption pattern (i.e., real actual consumption) falls within threshold 1 (promotion not implemented) or threshold 2 (promotion implemented). Thresholds 1 and 2 may be, for example, stochastic confidence levels which are determined, for example, per tap per bar.

Competition between bars may be increased by the contest campaign. Sales may be increased by the competition.

Consumption in the bar may be influenced by the discount campaign, as the bar owner may have larger margins for every volume (e.g., liter) of beverage poured for the discounted brand. The increased margins may incentivize the owner to market the brand more than other non-discounted brands.

Optionally, at 512, the results of the advertisement profile are analyzed, for example, the effects on beverage consumption and/or revenue. Optionally, future advertisement profiles are generated according to the results, for example, similar profiles and/or adjusted profiles.

Attention is now diverted to FIG. 8, which is a screen shot of an exemplary graphical user interface for tracking advertisement profiles, in accordance with some embodiments of the present invention. The graphical user interface may be used to help determine outcomes of advertisement profiles. Future advertisement profiles may be selected according to the outcomes of previous profiles. Alternatively or additionally, the graphical user interface may be used to monitor current advertisement profiles. In processes profiles may be continued, adjusted or stopped depending on the monitoring outcomes.

Figure 6:
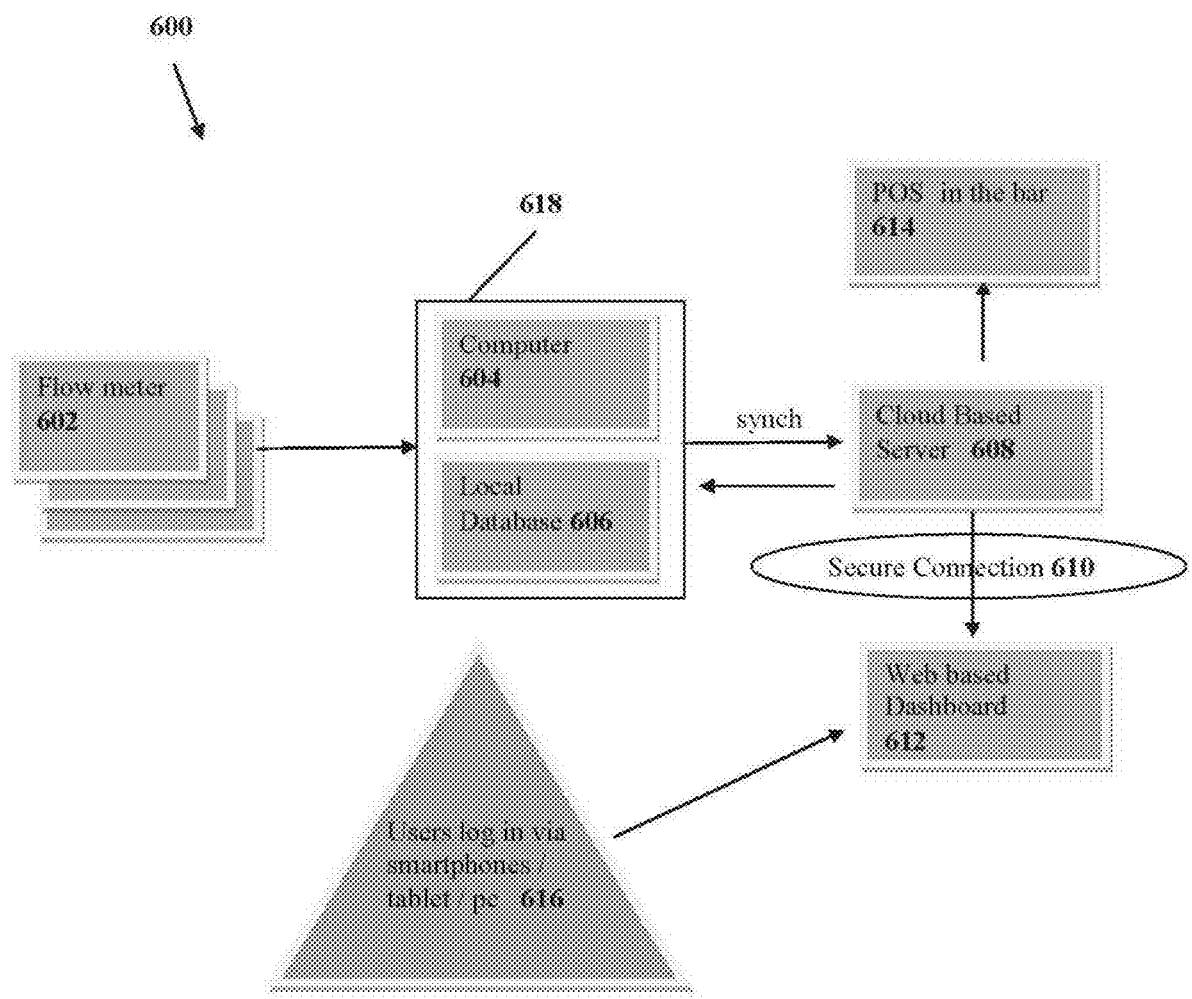
FIG. 6 is another embodiment of a system for analysis of beverage dispensing data, in accordance with some embodiments of the present invention.

Reference is now made to FIG. 6, which is another embodiment of a system 600 for automatically analyzing beverage dispensing data, in accordance with some embodiments of the present invention.

Multiple flow meter sensors 602 for generating signals indicative of beverage dispensing are located in multiple beverage serving facilities. For example, sensors 602 count electronic pulses generated by the flow of liquid past the sensor. Signals from sensors 602 of each facility are sent to a computer 604 in electrical communication with sensors 602. Each facility may have one computer 604 collecting signals from sensors 602 at that facility.

Optionally, computer 604 is in electrical communication with a memory having a stored local database 606, for storing data recorded by sensors 602. Alternatively or additionally, database 606 stores one or more installation parameters, for example, number of beer lines, beer line names, calibration parameters, prices, bar address, number of seats in the bar, contact details, and/or other parameters. Alternatively or additionally, database 606 backs-up data.

Optionally, memory stores a signal processing module for filtering signals generated by sensors 602, for example, removing noise from the signals and/or identifying signals as being related to beer dispensing or other activities (e.g. beer line cleaning, empty keg gas flow, or other activities).

Optionally, sensors 602 are designed for plug-and-play. Sensors 602 at a facility plug into a box 618 housing computer 604, for example, using USB connectors. Alternatively, sensors 602 connect wirelessly with computer 604.

Optionally, box 618 has a power plug for connection to an electricity socket. Alternatively or additionally, a battery is located within box 618. The battery may be part of an uninterruptible power supply (UPS).

Optionally, sensors 602 and box 618 are sold as a kit, for example, 3-5 sensors with one box. Optionally, additional sensors may be purchased individually.

Optionally, sensor 602 and/or computer 604 are pre-calibrated and/or configured by the manufacturer, for example, with the parameters of the client bar, for example, the number of tap, prices, brands, 3G connectivity parameters, or other parameters.

Optionally, the installation is performed by connecting sensors 602 with the fluid lines, optionally connecting sensors 602 to box 618 and optionally plugging the box to a power supply. Optionally, the installation is performed with one type of connection, sensors 602 to box 618. Installation may be performed, for example, in under about 60 seconds.

Optionally, data from multiple computers 604 at multiple facilities is sent to a cloud based server 608 for analysis, for example, using a wire and/or wireless internet connection. Data may be sent from facilities around the world. Optionally, data is sent automatically from box 618, for example, using a wireless 3G and/or WIFI™ connection, and/or using a wired connection.

Data may be combined from multiple facilities for the analysis, for example, performing cross-platform analysis, and/or each facility is a node which is part of a complex node system with mutual impact. Cloud based server 608 may provide for central processing of data from geographically diverse facilities, flexibility, scalability, and/or fast response.

Data may be analyzed by server 608, for example, to suggest optimized pricing profiles, to identify market trends, to estimate beer waste percentage per bar, to suggest optimal discounts per region per time frame, to help optimize supply chain management issues of the brewery such as transportation and/or keg amounts in each delivery route, and/or other analysis, for example, as described herein. Reports may be generated accordingly.

Beer waste may be automatically calculated using the data, for example, based on beer sales minus measured consumption. Alternatively or additionally, beer waste is manually calculated, for example, by the bar owner after being provided with the beer sales figures and the corresponding measured consumption figures.

Data analyzed by server 608 and/or any recommendations (e.g., price profile, advertisement profile) are displayed on a web-based dashboard 612. Optionally, a secure connection 610 is used to access server 608 using dashboard 612. Optionally, users log-in 616 to dashboard 612 using Smartphones, tablets, and/or personal computers.

Optionally, computer 604 performs synchronization processes with server 608. Optionally, data on database 606 is synchronized with server 608 as period updates. Alternatively or additionally, computer 604 sends beverage dispensing data to server 608. Data may be sent continuously or in bursts, for example, about every second, about every 5 seconds, about every 30 seconds, about every minute, about every 15 minutes, about every hour, about every 4 hours, about every day, or other time values.

Optionally, server 608 is integrated with a point-of-sale (POS) 614 of the facility. Optionally, the facility manager is provided with the ability to change the pricing and/or incentives for various items. Optionally, the changes are made with clicks. Optionally, the changes are made using remote access, for example, using a mobile device with an internet connection.

Figure 11:
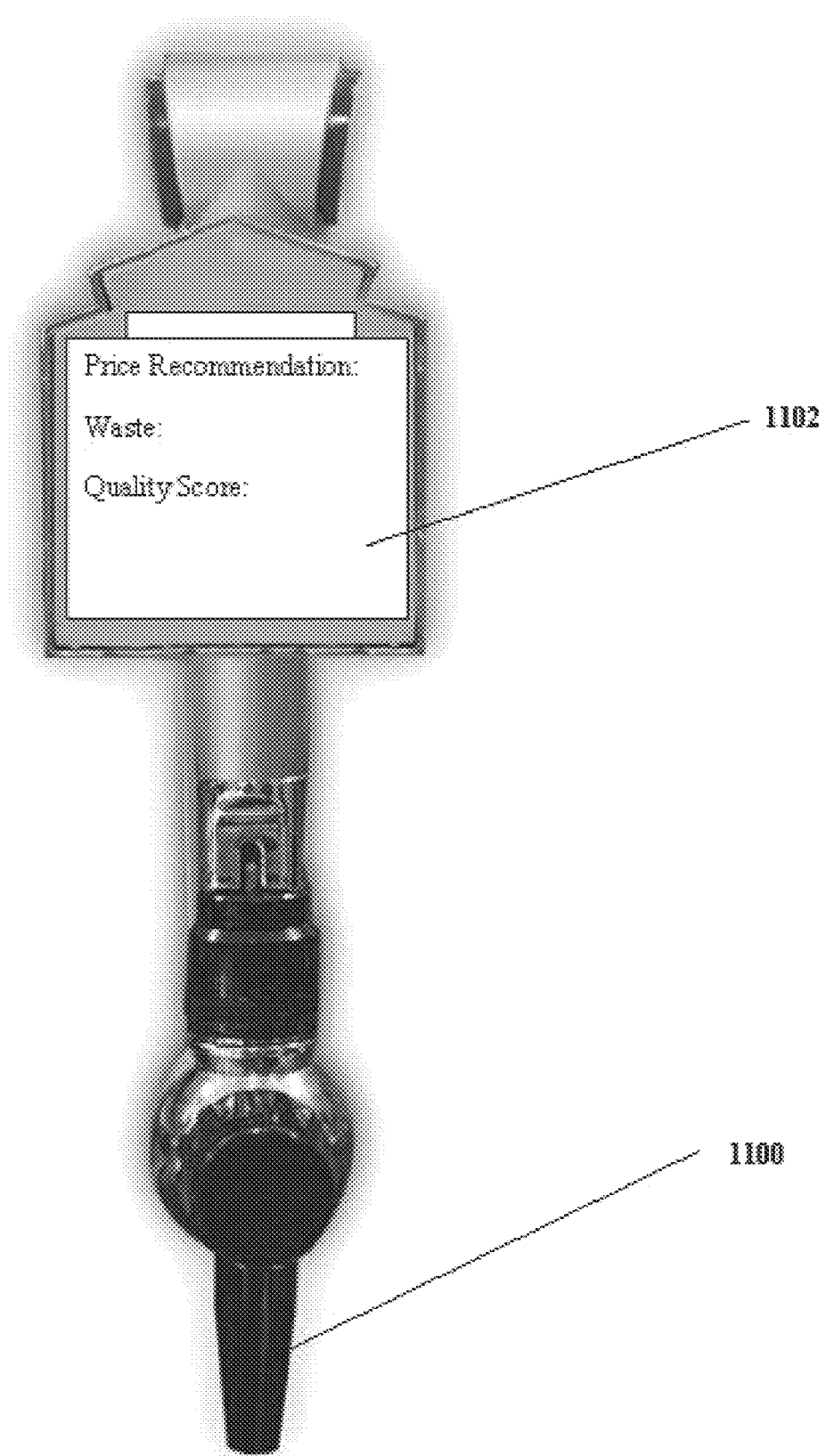
FIG. 11 is a schematic of a beer tap with a screen displaying processed data, in accordance with some embodiments of the present invention.

Reference is now made to FIG. 11, which is a schematic of a beer tap 1100 with a screen 1102 (e.g., LCD) displaying processed data, in accordance with some embodiments of the present invention. Optionally, screen 1102 is in electrical communication with processor 106 of FIG. 1, cloud server 608 of FIG. 6, or other local and/or remote processors. Alternatively or additionally, the processor is built into the screen.

Optionally, screen 1102 has an attachment sized and/or shaped to fit on beer taps, for example, on the pipe, on the handle, or at other locations on the tap.

Optionally, screen 1102 is sized and/or shaped to be compact and/or non-intrusive, for example, about 5 centimeters (cm)×10 cm, about 7 cm×7 cm, or other sizes.

Screen 1102 may display one or more of any of the processed data as described herein, in any combination. Optionally, screen 1102 displays data related to the beer dispensed through tap 1100. For example, screen 1102 may display the current implemented price recommendation profile for the beer being served, waste percentage (e.g., during the shift of the bartenders, for the current beer glass), current calculated quality scores for the beer, or other data.

Displaying the data directly in front of the bartender as beer is being dispensed may help remind the bartender, for example, of how much discount to provide, or any promotions associated with the beer. The bartender may monitor progress related to the beer as beer is being dispensed and take action, for example, noting the current rate of waste (and being aware to reduce the waste), noting the current quality of beer (and taking action if quality is falling).

It is expected that during the life of a patent maturing from this application many relevant sensors and processors will be developed and the scope of the terms sensors and processors are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method of providing price recommendations for beverage dispensing facilities, the method being carried out by a beverage dispensing analysis unit programmed to carry out the steps of the method, which comprise:

receiving, at a cloud based server, a plurality of real-time beverage dispensing data of dispensed beer, transmitted to said cloud-based server over an internet connection by a plurality of local processing units, each of said plurality of local processing units installed in a different one of a plurality of beverage dispensing facilities located in a plurality of different geographic locations, said plurality of real-time beverage dispensing data is generated by a plurality of fluid flow sensors providing said beverage dispensing data, in real time, to a respective one of said plurality of local processing units, each of said plurality of flow sensors is designed to generate signals in response to sensing of a flow of dispensed beer and is installed in parallel with beverage lines connecting a beer keg with a respective beer dispensing tap having a handle for operating the tap;

automatically applying a statistical analysis, at real time, on the beverage dispensing data from the plurality of dispensing facilities, for calculating a plurality of statistical dispensing patterns, each of said plurality of statistical dispensing patterns is calculated for one of the beverages during a predetermined period of time, each of said plurality of statistical dispensing patterns is calculated for respective one of said plurality of beverage dispensing facilities;

performing a comparison between the plurality of statistical dispensing patterns to identify one or more statistical correlations of beverage consumption among said plurality of different beverage dispensing facilities;

automatically generating, in real time, a respective price recommendation profile for each of at least some of said plurality of beverage dispensing facilities, using a mathematical tool to calculate an optimized price, according to the statistical correlation and based on received data indicative of respective monitored revenue achieved at said at least some of said plurality of beverage dispensing facilities, said respective price recommendation profile includes temporary changes in price of the beverages for the at least some of said plurality of beverage dispensing facilities;

generating a plurality of presentations, each fitted to be displayed to a respective bartender in a respective beverage dispensing facility of said at least some of said plurality of beverage dispensing facilities, presenting said respective price recommendation profile;

wherein at least one of the plurality of generated presentations is fitted and instructed to be displayed on a screen sized and shaped to be attached to a beer dispensing tap having a handle for operating the tap and related to said respective price recommendation profile and used by said respective bartender.

2. The computer-implemented method of claim 1, wherein the temporary changes comprise a temporary price reduction for the beverage within at least one of a time range and one or more dates.

3. The computer-implemented method of claim 1, further comprising automatically forecasting future beverage consumption patterns according to past beverage consumption patterns.

4. The computer-implemented method of claim 1, wherein the method is performed in substantially real time so that the price recommendation profile is in accordance with current beverage consumption patterns.

5. The computer-implemented method of claim 1, further comprising receiving signals indicative of a number of patrons in at least some of said plurality of beverage dispensing facilities, and generating the price recommendation profile in accordance with the number of patrons.

6. The computer-implemented method of claim 1, further comprising receiving data from an external source and generating the price recommendation profile in accordance with the received external source data.

7. The computer-implemented method of claim 6, wherein the data from the external source comprises data associated with at least some of said plurality of beverage dispensing facilities and comprising one or more of: current weather, weather forecast, day of week, holidays, special events.

8. The computer-implemented method of claim 1, further comprising receiving a target profile associated with beverage consumption, and generating the price recommendation profile in view of the target profile.

9. The computer-implemented method of claim 1, further comprising automatically monitoring beverage consumption during implementation of the price recommendation profile.

10. The computer-implemented method of claim 9, further comprising generating future price recommendation profiles according to monitored effects of beverage consumption during implementation of previous price recommendations profiles.

11. The computer-implemented method of claim 1, further comprising determining the most cost-effective price recommendation profile provided by manufacturers to beverage dispensing facilities.

12. The computer-implemented method of claim 1, wherein automatically analyzing comprises automatically analyzing the beverage dispensing data of the dispensed beer, for calculating a statistical pattern of beverage consumption for at least two different beverages at the at least one beverage dispensing facility; and wherein automatically generating comprises automatically generating a price recommendation profile for one of the beverages according to the statistical pattern so that the second beverages is cannibalized.

13. The computer-implemented method of claim 1, wherein each of the plurality of beverage dispensing facilities is selected from the group comprising: bar, pub, hotel, restaurant.

14. The computer-implemented method of claim 1, wherein the price recommendation profile comprises a price per liter for at least one of beverage dispensing facilities and clients of the facilities.

15. The computer-implemented method of claim 1, wherein automatically analyzing further comprises clustering dispensing patterns into standard beer glass of between 0.5 liter and 0.3 liter.

\* \* \* \* \*